Dec. 16, 1930.   J. F. SMITH   1,784,996
PADDED UPHOLSTERY, HARNESS, AND PACK FOR AIRCRAFT CHAIRS
Filed April 3, 1929   4 Sheets-Sheet 3

James Floyd Smith, INVENTOR

BY Victor J. Evans, ATTORNEY

WITNESS:

Dec. 16, 1930.  J. F. SMITH  1,784,996
PADDED UPHOLSTERY, HARNESS, AND PACK FOR AIRCRAFT CHAIRS
Filed April 3, 1929      4 Sheets-Sheet 4

James Floyd Smith, INVENTOR
BY Victor J. Evans
ATTORNEY

WITNESS:

Patented Dec. 16, 1930

1,784,996

UNITED STATES PATENT OFFICE

JAMES FLOYD SMITH, OF TRENTON, NEW JERSEY, ASSIGNOR TO SWITLIK MANUFACTURING COMPANY, INC., OF TRENTON, NEW JERSEY, A CORPORATION OF NEW JERSEY

PADDED UPHOLSTERY, HARNESS, AND PACK FOR AIRCRAFT CHAIRS

Application filed April 3, 1929. Serial No. 352,225.

Commercial flying has now reached a point in aviation, where there are a number of flying fields springing up in various localities, and where it has become a necessity to make some provision for the discharge of a passenger or passengers for any one of several reasons. In case of emergency or to land a passenger, where a plane does not usually land the passenger can either drop from the airship with a parachute without attention or assistance from pilot or attendant, or may be dropped by the pilot.

Also should the pilot have engine trouble or some mishap to the ship's structure, either in the operating means thereof or the wings or otherwise, the pilot or an attendant may easily strap the combined padding, harness and parachute to the passenger, and without any effort on the part of the passenger drop the passenger with a parachute without interfering with parts of the airship.

In a co-pending application filed the third day of April, 1929, Serial No. 352,226, there is disclosed a certain structure releasable trap door or doors in the bottom of the fuselage, together with a releasable seat, so that when it is the purpose to release a passenger, the door or doors and the seat may be unfastened, whereby the pilot may discharge the passenger through the door opening without any effort or thought on the part of the passenger, and it is in connection with this structure of trap door or doors and releasable seat that this present invention is to be used.

The parachute pack is attached to the harness, which in turn is attached to the upholstery, which is releasably attached to the upper portion of the back of the chair. The pull ring of the rip cord is carried in a pocket on the side of the upholstery, and a short portion of the rip cord terminates in means to releasably retain the pack closed, and the other relatively long portion of the rip cord is arranged in convolutions disposed in compartments of another pocket on the upholstery, the longer portion terminating in a snap hook, which is releasably attached to the side of the chair, so that when the upholstery has been released from the chair, the occupant of the chair is free to be dropped through an exit opening in the bottom of the fuselage, and when the passenger has descended the required distance, the parachute pack is released and the parachute opens and takes the air.

With these ideas in view, it is the purpose to provide an improved padded upholstery made to conform to a chair and seat, the padding being made of any suitable material preferably leather padded with kapok, such as will float a person in water and made to correspond with the chair, and so attached to the seat as to be comfortable for the user. The construction and arrangement of the padding being such that it may be quickly attached to the passenger, either by the passenger or an attendant.

Another purpose is to provide a harness carried by the padding and which is preferably releasably locked in the chair or to the seat, so that when attached to a passenger, the passenger cannot leave the seat except by dropping downward, or by the lock being released, which may be accomplished through a control operated by a pilot or attendant.

Another purpose is to provide a parachute pack of any type, said pack being attached to the harness and hence constituting a pad for a seat.

Still another purpose is to provide in a device of this kind, wherein should it be undesirable for some reason to drop the passenger through the bottom, another control may be operated to release the harness from the seat simultaneously with the release of the automatic parachute release cable thus allowing the passenger to leave the plane by any other exit with a free type manually operating parachute pack.

In small planes where no attendant is used, or carried, the padding can be attached to the passenger before leaving the ground or can be easily attached by the passenger after ascension in the air, that is after once having been shown the method of attaching the padding, as the passenger could not put the padding on incorrectly.

A further purpose is to provide upholstery and harness including the pack, said harness being connected to the parachute suspension lines, so that the person descending by means of the parachute may be suspended in an upright position from the parachute.

A still further purpose is a provision and means for folding the upper part of the upholstery and side portions thereof over the back of the chair and the arm rests, in conjunction with means, whereby, when the folded back portions are released from the back and the arm rests, they may automatically move into position, whereby the harness may be applied and tightened on the body of the passenger.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

Referring to the drawings, 1 identifies a padded upholstery, which is of a contour such as will conform to and fit a chair adapted to receive a passenger carried in an airship. The padding may be made of any suitable material preferably stuffed with kapok, preferably tufted and upholstered and otherwise constructed to give the appearance of a very comfortable chair. The material of the padding is adapted to be such as will float a person in water.

Figures 4, 5, 6, 8, 10:
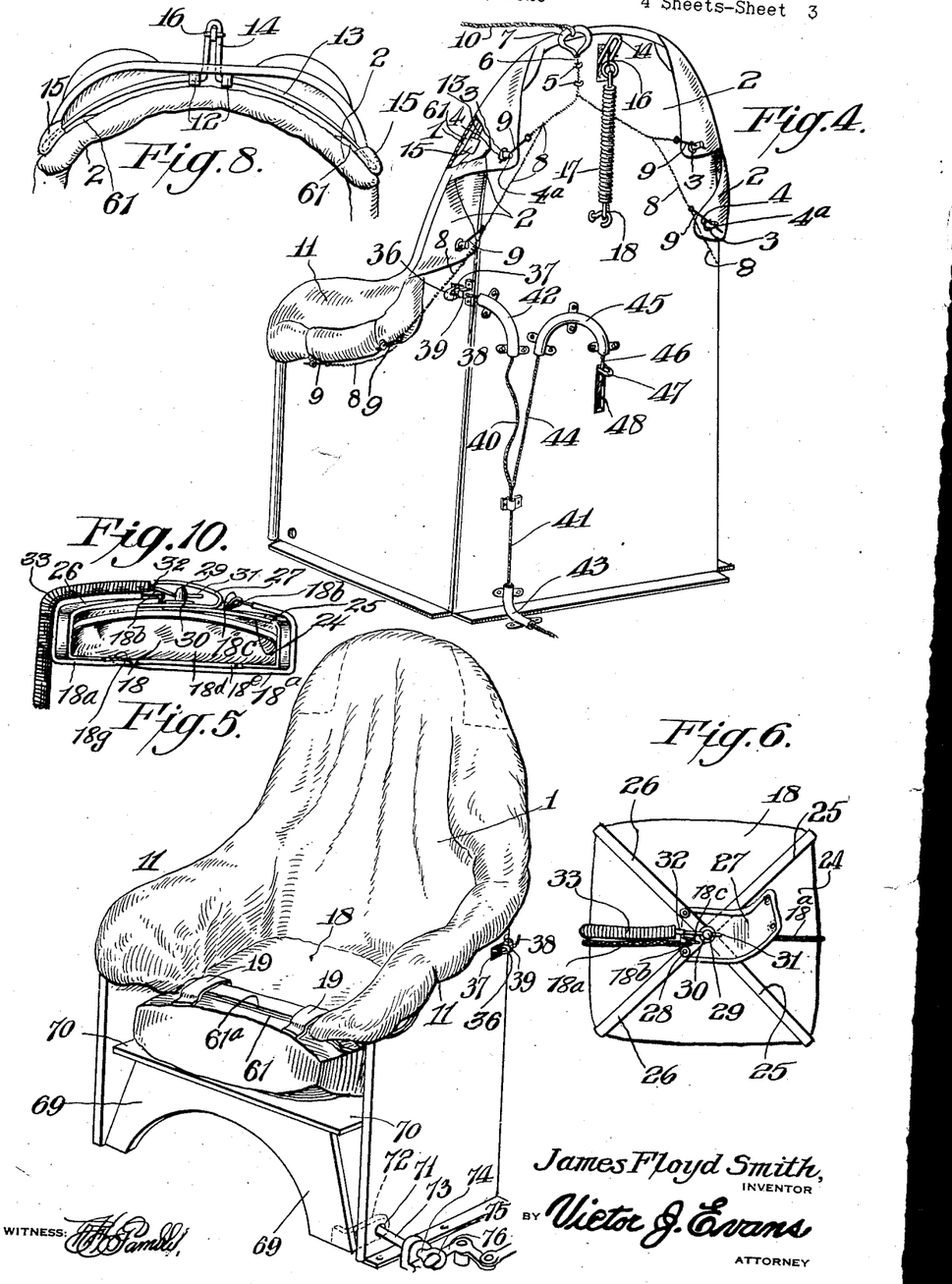
Figure 4 is a perspective view of the chair with the padding and harness connected thereto in proper position, showing the release for the harness and the pull ring, showing the parts of the padding folded over the back of the chair.
Figure 5 is a perspective view of the chair with the padding associated therewith, and also illustrating the pack.
Figure 6 is a bottom plan of one form of parachute pack showing the releasing pin.
Figure 8 is a detailed view of the means for removing the folded part of the padding to a substantially upright position, partly in position adjacent the shoulders of the passenger.
Figure 10 is a side view of the pack in Figure 6.

The upholstery is of such construction, that when it is applied to the wearer, and the wearer is standing, the upholstery may be held in any position by the harness, said upholstery serves as padding between the body of the wearer and the harness, and when the upholstery is not applied to the wearer it conforms to the chair. The front edges of the padding merge into an upper back edge, and when the padding is received within the chair said edges or portions fold over the back and arms of the chair, the folding parts or flaps 2 are provided with openings or apertures 3 with eyelets 4 therein, which eyelet openings are adapted to receive studs 4a which project from the back of the chair as shown in Figure 4. Operating slidably in guides 5 on the back of the chair is a cable 6 having a loop 7 at one end, and branching cables 8 at its other end. These branching cables carry pins 9 which pass through openings in the studs, thereby holding the flaps folded over the back of the chair. When it is desired to release the padding from the chair the loop 7 may be pulled, by an attendant or it may be pulled by a pilot. For instance a cable 10 is attached to the loop 7 and which cable may be carried back in a position to be grasped by the pilot enabling it to be actuated.

Upon pulling the loop the branches 8 of the cable will pull upon the pins and disengage them from the studs, which will allow the flaps to move out of engagement with the studs. These flaps serve only to hold the upholstery and harness to the chair. When the flaps are free of the studs, they hang loose, while the harness is moved into a position to permit the occupant of the chair to insert arms under shoulder straps, and by drawing the harness together in the front in a manner desired, the upholstery may be arranged in any desired position in front. This arrangement leaves the flaps attached to back portion of the upholstery and underneath the back of arms.

Figure 1:
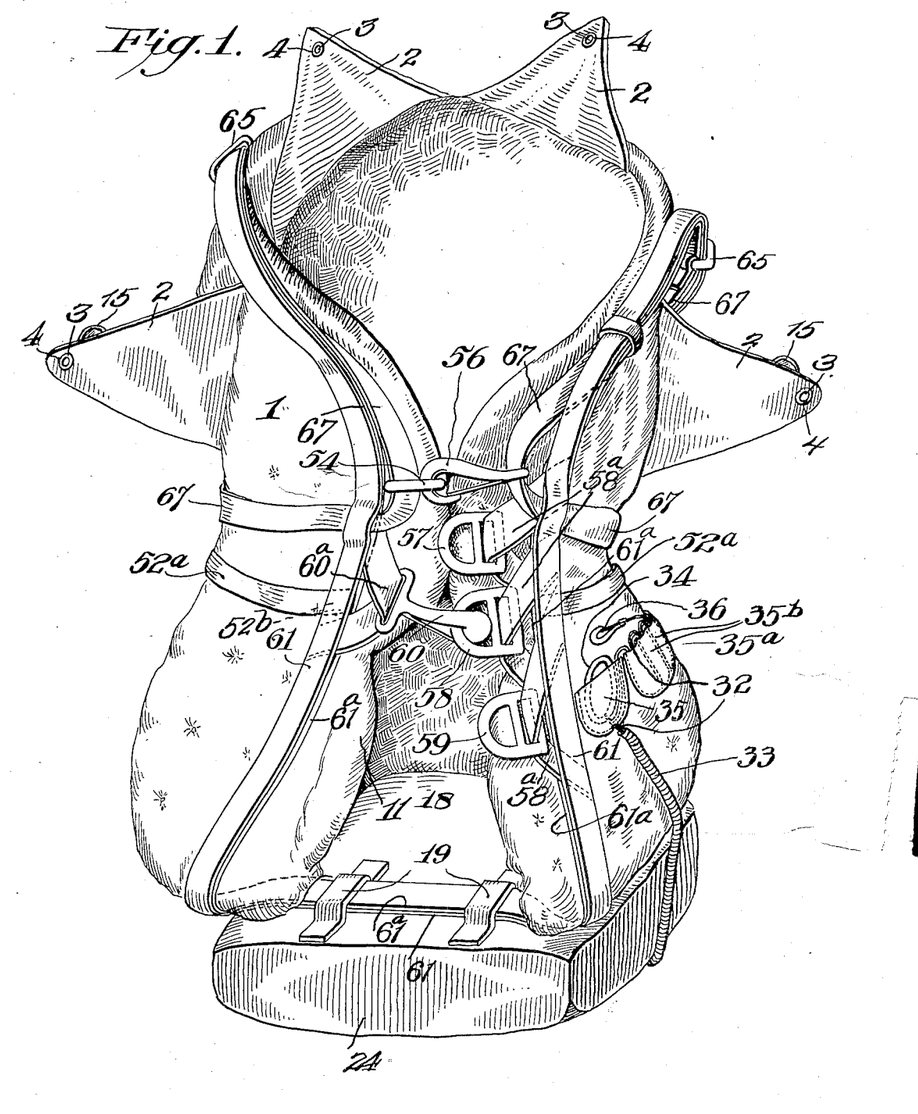
Figure 1 is a view in perspective of the improved padding and harness for use in connection with a parachute, illustrating the various parts of the harness including snap hooks and fasteners to hold the padding in position as well as the harness.

When the harness is drawn together in front and connected as in Figure 1, the upholstery and the front edges thereof may assume any desired position. The upholstery is to be made of a relatively maximum size, therefore on practically all persons it will be bunched here and there, but on relatively large persons the upholstery will assume substantially less bunched condition, the upholstery further serving as a padding between the body and the harness. When the upholstery and harness is so applied the passenger is free to be discharged through the exit opening as disclosed in the cooperating application identified herein.

In order to cause the harness to move into position to be arranged over the shoulders and around the body, bearings 12 are arranged on the inner surface of the seat back of the chair near the top thereof. Mounted in the bearings 12 is a curved spring member 13 having a central loop 14. It will be noted that the bearings 12 are adjacent the lower ends of the sides of the loop 14, so as to prevent any movement of the spring wire member. The ends of the spring wire member 13 slip into guide pockets 15, preferably on the harness, though they can be on the upholstery, so that when the spring member is actuated the ends of the spring member will move relative to the pockets, as shown in Figure 8.

Attached at 16 to the loop 14 of the spring member 13 is a coil spring 17, which in turn is connected to a hook identified at 18 on the back of the chair. It is the coil spring 17 that tensions upon the spring wire 13 to move its terminal portions upward to move the upholstery and harness into position over the shoulders, while the flaps drop down and backward. When the spring member 13 is operated as identified above, its terminal portions are upwardly protruded and into the pockets 15.

Hence when the passenger is discharged or allowed to drop regardless of effort to prevent or insure such operation, gravity of the passenger will overcome the tension of the spring member 13 and the spring 17, the end portions of the spring member bending forwardly and downwardly allowing its terminals to automatically disengage from the pockets 15. As soon as the pockets on the harness disengage from the terminals of the spring member 13, the spring 17 will actuate the spring member 13 and restore it to a position, where it may be used to perform a similar operation, when the upholstery is again applied to the chair.

Figure 7:
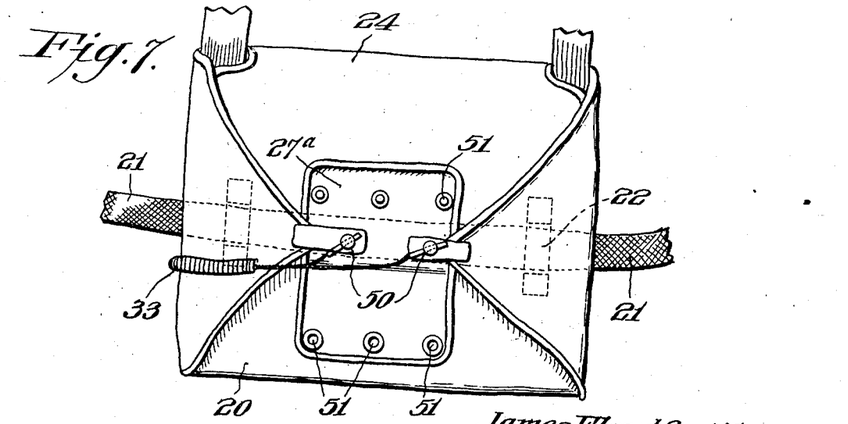
Figure 7 is a plan view of a different form of parachute pack showing cover pieces for the releasing pins and illustrating two sets of releasing pins.

While the padding is used as a covering it gives an upholstered appearance to the chair, and arranged near its lower portion is a parachute pack, which is carried by the harness, such as may be found in Figure 6 or as found in Figure 7. In other words the pack is carried by the harness, the surface of the pack as shown in Figures 6 and 7 faces downwardly, there being means 19 as in Figure 5 to connect the pack 18 to the harness.

Figure 7 shows a bottom plan view of a parachute pack 20, and carried thereby is a strap or member 21, which is connected to the pack at 22.

The pack in Figure 6 comprises the parachute not shown, but on the interior of the container 24, which may be made of any suitable material preferably canvas or the like.

The parachute pack 18, as in Figure 6, comprises a bottom portion, which is attached to the harness, as shown in Figures 1 and 5 at 19. The top covering 24 of the pack constitutes a canvas parachute, with its edges tucked under itself on top of folded parachute pack. The top covering 24 is provided with reinforcing tapes 25 and 26, which are arranged in V-shaped positions. The tapes 25 extend from the top center of the pack to the corners at the right, and the tapes 26 extend from the top center of the pack to the corners at the left, Figure 6. The tapes at the corners of the pack are attached to the bottom of the pack, said tapes extending from the top of the parachute, which is really the top covering 24. Referring to Figure 6 the V-shaped arranged tape on the side where the flexible conduit 33 is disposed has a grommet 30 attached, and also an extension turn back flap 27, which is attached to the V-tape 26. This extension turn back protection flap has snap fasteners 28 to hold the flap 27 folded. The other V-shape tape at its apex has a cone stud 29, which is pinned through the grommet 30 by the pin 31, which is attached to the wire cable 32, which passes through the flexible conduit 33 as partly shown in Figure 6, and partly in Figure 2. When the pin 31 is pulled, the springs (not shown) in the parachute throw open the tapes, allowing the parachute to take the air and leaving the parachute uncovered, whereby it may substantially open and take the air.

Figures 2, 3:
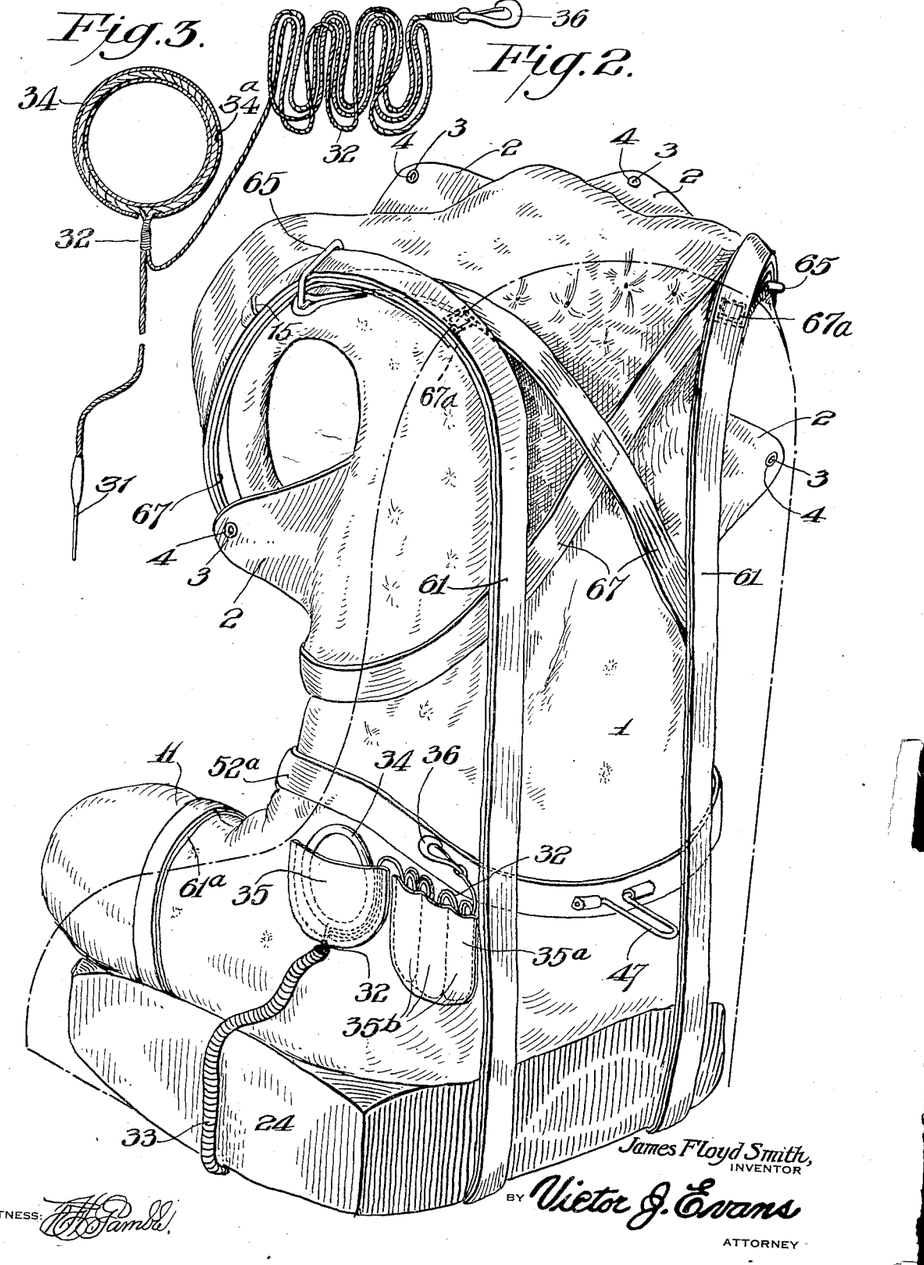
Figure 2 is a perspective view of the padding and harness showing one of the sides and the back, illustrating the chair in dot and dash lines.
Figure 3 is a detailed sectional view through the pull ring and a pull cord, showing the cord arranged in a plurality of convolutions, whereby the cord may be disposed in compartments of a pocket.

The cable 32 in turn is attached to a pull ring 34. This pull ring engages within a pocket 35 on the side of the padded upholstery as shown in Figure 2, and is hollowed out to receive a loop 34a of the cable or pull cord 32 as shown in Figures 2 and 3. A snap hook 36 is carried by the end of the cable or pull cord and is designed to protrude through an opening 37 constructed in the side of the chair. After arranging the loop 34a in the hollow ring, the two portions of the pull cord or cable 32 are spliced or otherwise secured together, and the portion of said cable or pull cord between the snap hook 36 and the pull ring is arranged into a plurality of convolutions, which are respectively disposed in the several compartments of the pocket 35a. The snap hook is engaged by a pin 38 guided in a bearing 39, and attached to the pin 38 is a branch 40 of a pull cable 41. This branch 40 operates through a guide tube 42 near the guide bearing 39, and also through a guide tube 43 on the lower part of the back of the chair.

The pull cable 41 passes back in a manner now shown to a remote suitable position to be reached and grasped by the pilot or by one of the crew. A second branch cable 44 is attached to the cable 41 and passes through a guide tube 45. The terminal of the branch cable 44 is connected to a pin 46, which engages in an opening of a loop 47 which is carried by the harness. This loop 47 engages through an opening 48 in the back of the chair.

Obviously when the cable 41 is pulled, thereby pulling on the two branches 40 and 44, the pins 38 and 46 are withdrawn simultaneously from the snap hook 36 and the loop 47, in which case the padded upholstery and harness are free of the chair, which will allow the passenger with the upholstery and harness applied to leave the chair, and if the occupant desires, may leave the air craft through any other exit with a free type manually operated pack, or may engage the snap to a wire or hook or other object near the exit before jumping, thereby permitting the pack to automatically open and the parachute allowed to take the air.

However, when the pilot desires to discharge or permit a passenger to drop, the padded upholstery is first released from the top of the back of the chair in the manner previously set forth, and then by operating the closure in the exit opening in the bottom of the aircraft in the manner set forth in the co-pending application, the closure will swing downward and the seat of the chair will likewise swing down, in which case the occupant with the upholstery applied will drop through the exit opening.

The slot 48 in the back of the chair is long enough to permit the loop 47 to slide off the pin 46, and since the snap hook 36 remains attached to the chair, the pull cable will automatically leave the compartments of the pocket 35a a distance equal to the length of the cord, in which case the parachute pack will be released and the parachute will then automatically open and take the air. The pack opens due to the pull cord extracting the pin 31 from the stud 29, in which case the container 24 of the pack will open, the parachute subsequently opening, allowing the passenger to gradually descend.

The parachute pack 18 as in Figures 1, 2 and 5 may be any suitable construction, for example as in Figure 7, or as in Figure 6 or otherwise. In Figure 6 there is disclosed a single withdrawing pin, while in Figure 7 there is disclosed two withdrawing pins 50, there being a slightly modified form of folding piece 27a with snap fasteners 51 to hold the piece closed over the two withdrawing pins.

As previously stated the padded upholstery may be any design preferably tufted and well padded, including the folding back portions for the back of the chair and its arm rests, and carried by the upholstery is a waist strap 52a, which carries a loop 47 as in Figures 2 and 4. This loop 47 engages through the back of the chair and is held in such position by the pin 46. The detachment of the loop 47 is accomplished by withdrawing the pin 46 through the medium of the cable or a pull cord 41.

The waist band or belt 52a extends around the body of the upholstery and carries the loop 47, and it has its ends secured at 52b under the straps 61 as shown in the front view in Figure 1.

The straps 67 are connected to metal loops 65 and extend across the back of the upholstery intersecting each other, and then pass about the body of the upholstery forwardly and upwardly and are attached at 67a to the straps 61 and 61a.

One of the straps 67 in the front of the upholstery carries a snap hook 56 and the other strap 67 in front of the upholstery carries a metal loop 54, which is engaged by the snap hook 56. By adjustably sliding the loop 54 and the snap hook to different positions, the harness may be tightened.

Figure 9:
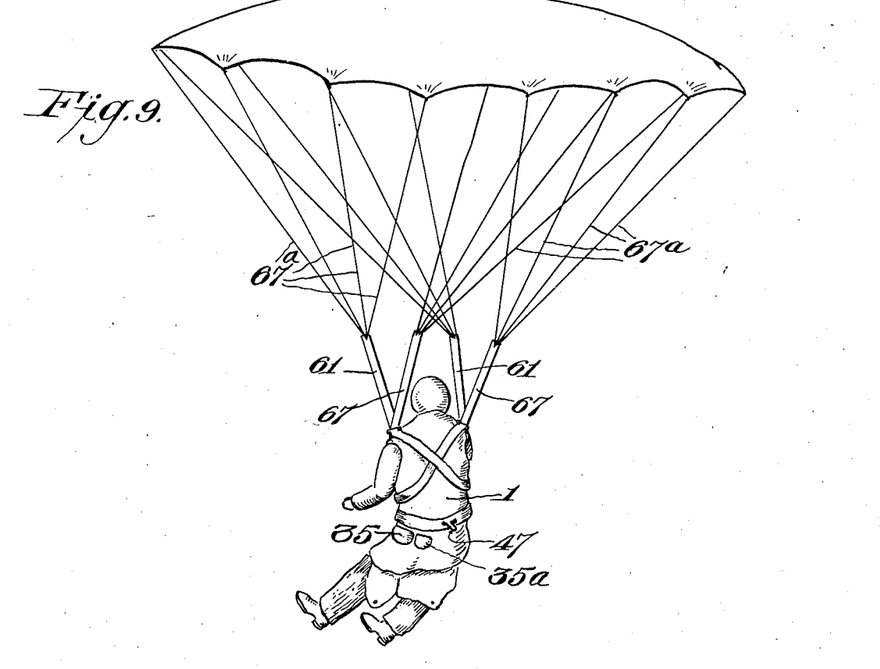
Figure 9 is a view showing the parachute opened up and padding and harness suspended therefrom with an occupant therein, certain of the straps of the harness being shown as connected to the suspension cords of the parachute.

Straps 61 and 61a are applied to the front portion of the upholstery, and under the same as in Figure 1 and through the strap loops 19, which are carried by the parachute pack as in Figure 1 thereby connecting the pack to the upholstery. The straps 61 and 61a extend the full length of the upholstery and then over the shoulders as in the front view of Figure 1, and through metal loops 65, down the back of the upholstery and into the parachute pack and are attached to the suspension cores 67a as shown in Figure 9.

Strap loops 58a attached to the upholstery and harness as shown in dotted lines in Figure 1 are provided, and these strap loops carry metal loops 57, 58 and 59, with any one of which a snap hook 60 carried by a strap loop 60a on the left hand side in Figure 1 may be connected, to assist in holding the harness adjustably together in the front.

A chair as in Figures 4 and 5 may be used in conjunction with the upholstery and harness, and a similar chair is disclosed in the co-pending application herein identified. An occupant while occupying the upholstered chair may don the upholstery and harness, and of the occupant's own free will and accord leave the ship or may be dropped by one of the crew. The padding and harness are detachably fastened to the upper part of the back of the chair, which as in the co-pending application has a hingeable seat, to which as in Figure 5 a support 69 is hingedly connected as at 70. This support rests upon releasable trap doors (not shown herein but disclosed in the co-pending application), so that when the trap door or doors are released and the support 69 released the seat will swing downwardly, allowing the occupant with the upholstery and the harness attached to escape through the exit opening, as in the co-pending application.

As an indication as to means for supporting the seat 70, the support 69 has lateral members 71, which in turn have openings 72 registering with openings 73 in the sides of the chair. Pins 74 shown in Figure 5, and which have eyes 75 to receive one arm of a bell crank lever 77, so that when the bell crank lever 76 is tilted the pin 74 is withdrawn, leaving the seat free to drop or hinge downwardly, that is when the closure of the exit opening (not shown) is allowed to open. In other words the holding means for the seat may first be released, that is after it has been determined by the pilot or one of the crew that it is best to drop the passenger. It is then necessary to release the closure. However before the passenger can be released it is necessary that the upholstery and harness be applied, and fastened about the passenger, which can be done by the passenger or by one of the crew.

After having released the upholstery from the chair and the harness fastened about the passenger the trap door or doors of the fuselage as disclosed in the co-pending application are released and allowed to swing, the seat likewise swinging downwardly, in which case the loop 47 disengages from the pin 46 on account of the slot 48 being long enough thereby permitting the passenger with the upholstery and harness thereon to drop through the exit opening, the rip cord paying out from the pocket 35a until the passenger has dropped a distance equal to the rip cord, in which case the pin 31 is withdrawn from the stud 29 allowing the pack to open and subsequently the parachute, the passenger being suspended under the parachute by means of the straps 61 and 67 as shown in Figure 9.

It is to be understood that the parachute pack, while it is attached to the harness at any portion thereof and in any manner, may be located in a position to occupy the seat or in a location to occupy a position adjacent the back of the upholstery, or in any other location.

As previously stated the parachute pack 18 in Figure 6 is so designed that the tapes 25 and 26 are thrown open. Furthermore the parachute pack comprises the covering 18d which is opposed to the covering 24, the tapes 25 and 26 being secured to the covering 18d and engaged over the corners of the pack. This covering 18d where it folds over the sides of the pack extend under the covering 24. This latter covering 24 is provided with diagonal springs, not shown, arranged in the same direction as the tapes 25 and 26. To cause the tapes to be thrown open so that the covering 24 may spring out of position braided elastic members 18a are provided.

One of these elastic members is attached at 18e, while the other is attached at 18g to the covering section 18d. These elastic members engage about the pack and terminate in hooks 18b, which are in turn engaged with the loops 18c. The elastic members are so disposed around the pack, that when the rip pin 31 is withdrawn from the cone stud 29, the elastic members will throw the tapes open. One of the elastic members on the right in Figure 10 is connected to the tapes 25, while the other on the left is attached to the tapes 26, and since the stud 29 is cone-shape at its end, it will automatically disengage from the grommet, and hence the tapes will be thrown open, and the covering 24 will automatically spring away from the pack and allow the pilotchute to open and take the air while the main parachute will subsequently open and take the air.

The invention having been set forth, what is claimed is:

1. An upholstery and harness for a passenger, comprising an upholstery having a parachute pack attached thereto, a harness carried by the upholstery, said harness having straps engaged over the shoulders of the upholstery and extending down the back and attached to the suspension cords of the parachute in the pack, and means either manually actuated or actuated by remaining attached to a fixed element of an airship for releasing the pack.

2. In a device as indicated the combination with a passenger chair of an aircraft, of an upholstery and harness fitting within the chair with means for detachably fastening same to the chair, whereby when the upholstery is released from the chair, the harness may be fastened about a passenger.

3. In a device as indicated the combination with a passenger chair of an aircraft, of upholstery and harness fitting within the chair with means for detachably fastening same to the chair, whereby when the upholstery is released from the chair, the harness may be fastened about a passenger, releasable means for retaining the harness connected to the chair, a parachute pack carried by the harness, the pack having a pull cord, means detachably connecting the pull cord with the chair, and means for simultaneously releasing the harness and the parachute pull cord from the chair, whereby the passenger is free to leave the chair with the upholstery, harness and pack attached.

4. In a device for the purpose indicated, the combination with a chair adapted for use within an aircraft fuselage and provided with a releasable hinged seat, of a passenger's upholstery having a harness connected to its exterior, with means carried by the harness to fasten it on the body of the passenger, a parachute pack and means for securing the pack to the harness, means for detachably connecting the harness to the chair, the upholstery adapted to fit and conform to the chair with means to detachably connect the upholstery to the back of the chair, said parachute pack being connected to the harness and provided with a pack releasing pull cord, said pull cord being releasably attached to the chair, means for releasing the upholstery from the chair, whereby it may be fastened to the passenger by the harness, and means for releasing the harness from the upholstery and by the passenger with the upholstery and harness may be dropped from the chair when the seat releases and swings downward allowing the passenger to drop through the bottom of the fuselage, whereby as the passenger drops a distance equal to the length of the pull cord the parachute pack opens.

5. In a device for the purpose indicated the combination with a passenger's chair adapted for use within an aircraft fuselage, of a tufted upholstery for the passenger including an attached parachute pack, the tufted upholstery fitting within and detachably secured to the chair and on the seat and constituting upholstering therefor.

6. In a device for the purpose indicated the combination with a passenger's chair adapted for use within an aircraft fuselage, of a tufted upholstery for the passenger including an attached parachute pack, the tufted upholstery and pack adapted to fit within and on the seat of the chair and constituting upholstering therefor, said tufted upholstery having a harness detachably connected to the back of the chair, separate individual means operable remote distances from the chair and operatively associated with the attaching means of the upholstery and harness for detaching the upholstery and harness from the chair to permit the passenger to leave the chair with the upholstery applied.

7. In a device for the purpose indicated the combination with a passenger's chair adapted for use within an aircraft fuselage, of a tufted upholstery for the passenger including an attached parachute pack, the tufted upholstery and pack adapted to fit within and on the seat of the chair and constituting upholstering therefor, said tufted upholstery having a harness detachably connected to the back of the chair, separate individual means operable remote distances from the chair and operatively associated with the attaching means of the upholstery and harness for detaching the upholstery and harness from the chair to permit the passenger to leave the chair with the upholstery applied, said parachute pack including a parachute releasing pull cord attached to the chair, whereby the dropping of the passenger through the bottom of an airship a distance equal to the length of the releasing pull cord, the pack is released and the parachute opens, and means connecting the parachute and the harness.

8. In a device for the purpose indicated the combination with a chair adapted for fixed use in an aircraft fuselage which may have an exit opening in the bottom, said chair having a hinged seat, of an upholstery and harness including a parachute pack connected to the harness to be associated within and conforming to the chair, said harness having means to hold the suit on the passenger, said pack having a releasing pull cord, means detachably connecting the harness to the chair, the pull cord being connected to the chair, and means remote from the chair and connected to the detachable means between the chair and the harness for releasing the harness whereby a passenger may escape from the chair and drop through the bottom of the fuselage.

9. In a device for the purpose indicated, a chair adapted for use in an airship fuselage, an upholstery for association within the chair, means for detachably connecting portions of the front edges and the edge portion of the upholstery to the chair, and means operable automatically when the front edges are released for moving the front edges in a position, whereby the harness may be fastened around the passenger.

10. In a device for the purpose indicated, a chair adapted for use in an aircraft fuselage, an upholstery for association within the chair, means for detachably connecting the chair, means for detachably connecting portions of the front edges and the edge portion of the upholstery to the chair, and means operable automatically when the front edges are released for moving the front edges in a position whereby the harness may be fastened around the passenger, a parachute pack attached to the upholstery and provided with a releasable pull cord with means for attaching the pull cord to the chair, a harness detachably connected to the chair, and means being remote from the chair and operably associated with and adapted to release the detachable connections between the harness and the chair, whereby the passenger may slide from the chair and drop through the bottom of the airship fuselage, the passenger adapted to drop a distance equal to the length of the releasing pull cord to release the pack and allow the parachute to open.

11. In a device for the purpose indicated, a chair adapted for use in an aircraft fuselage, an upholstery for association within the chair, means for detachably connecting the chair, means for detachably connecting portions of the front edges and the edge portion of the upholstery to the chair, and means operable automatically when the front edges are released for moving the front edges in a position, whereby the harness may be fastened around the passenger, a parachute pack attached to the upholstery and provided with a releasable pull cord with means for attaching the pull cord to the chair, a harness for the upholstery detachably connected to the chair, and means being remote from the chair and operably associated with and adapted to release the detachable connections between the harness and the chair, whereby the passenger may slide from the chair and drop through the bottom of the airship fuselage, the passenger adapted to drop a distance equal to the length of the releasing pull cord to release the pack and allow the parachute to open, and means operably associated with the releasable pull cord and the means which releases the harness from the chair, for releasing the pull cord from the chair, whereby the passenger may leave the chair with the upholstery and harness attached.

12. In a device for the purpose indicated, an upholstery and harness for aircraft passengers, the upholstery being tufted, well padded and adapted as a padding between the wearer's body and the harness, as well as conforming to and detachably secured to the back of a chair and constituting an upholstery for the chair.

13. In a device for the purpose indicated, the combination with a chair for use in an aircraft fuselage of a combined upholstery and harness conforming and constituting upholstery for the chair, and means for detachably fastening the upholstery within and to the chair back.

14. In a device for the purpose indicated, the combination with a chair for use in an aircraft fuselage, of a combined upholstery and harness conforming to the chair, a strap of the harness having a loop, the back of the chair having an elongated opening through which the loop engages, and means to engage through the loop on the face of the chair back, to prevent the passenger from rising from the chair, but allowing the harness to detach, when the passenger slides downwardly from the chair.

15. In a device for the purpose indicated, the combination with a chair for use in an aircraft fuselage, of a combined upholstery and harness conforming to the chair, the harness having detachable connections with the back of the chair, the construction and arrangement of the detachable connections being such as to prevent the passengers from rising, but allowing the harness to detach when the passenger is dropped downwardly from the chair.

16. In a device for the purpose indicated, the combination with a chair for use in an aircraft fuselage, of a combined upholstery and harness conforming to the chair, means for detachably connecting the upper part of the upholstery to the back of the chair including means actuated by any one from a remote point to release the upholstery from the chair.

17. In an aircraft, a chair for use in the fuselage thereof, an upholstery for the chair being releasably attached to the upper portion of the back of the chair, a harness attached to the upholstery and being releasably attached to the chair, a pack carried by the harness, the upholstery being released from a remote point prior to the automatic release of the harness.

18. In an aircraft, a chair for use in the fuselage thereof, an upholstery for the chair being releasably attached to the upper portion of the back of the chair, a harness attached to the upholstery and being releasably attached to the chair, a pack carried by the harness, the upholstery being released from a remote point prior to the automatic release of the harness, and means automatically associated with and between the pack and the chair for causing an opening release of the pack when the wearer of the upholstery has dropped the required distance from the aircraft.

19. In an aircraft, a chair for use in the fuselage thereof, an upholstery for the chair being releasably attached to the upper portion of the back of the chair, a harness attached to the upholstery and being releasably attached to the chair, means at the top of the upholstery to move the upper part of the upholstery and the front edges thereof around an occupant of the chair, whereby the harness may be tightened over the front of the body of the occupant, a pack carried by the harness, the upholstery being released from a remote point prior to the automatic release of the harness.

20. An upholstery for an aircraft chair comprising a padding to conform to the chair and having a harness attached thereto, means for releasably attaching the upper part of the upholstery to the back of the chair, and means for moving and disposing the upper part of the upholstery and the front edges thereof about an occupant of the chair, when the upholstery is released, whereby the harness may be drawn tight around the body of the occupant.

In testimony whereof he affixes his signature.

JAMES FLOYD SMITH.